United States Patent [19]

Madsen

[11] Patent Number: 5,090,853
[45] Date of Patent: Feb. 25, 1992

[54] FASTENER WITH TAPER ATTACHED COMPONENT

[76] Inventor: Morres F. Madsen, 1024 S. 2nd, Coos Bay, Oreg. 97420

[21] Appl. No.: 670,561

[22] Filed: Mar. 18, 1991

[51] Int. Cl.$^5$ .................................. F16B 19/00
[52] U.S. Cl. ......................... 411/354; 411/337; 411/384; 411/396; 411/918; 411/511
[58] Field of Search ............... 411/337, 354, 918, 376, 411/396, 384, 511, 500

[56] References Cited

U.S. PATENT DOCUMENTS

| 939,933 | 11/1909 | Trautner | 411/384 |
| 1,185,402 | 5/1916 | Hopkins | 411/354 |
| 1,453,952 | 5/1923 | Samanich | 411/354 X |
| 1,519,308 | 12/1924 | Hood | 411/354 |
| 1,521,489 | 12/1924 | Vaughan | 411/455 |
| 1,665,875 | 4/1928 | Comeau | 411/337 |
| 1,913,408 | 6/1933 | Paul | 411/918 X |
| 2,505,915 | 5/1950 | Salmi | 411/918 X |
| 3,444,773 | 5/1969 | Ligne | 411/918 X |

FOREIGN PATENT DOCUMENTS

| 862456 | 12/1940 | France | 411/411 |
| 93509 | 4/1987 | Japan | 411/337 |

Primary Examiner—Rodney M. Lindsey
Attorney, Agent, or Firm—James D. Givnan, Jr.

[57] ABSTRACT

A fastener with components locked to a fastener shank by tapered inserts disposed about a tapered segment of the shank. The attached components include an internal frusto-conical wall having a taper corresponding to the tapered inserts. Both the head as well as the threads of a fastener may be affixed to a common shaft.

7 Claims, 1 Drawing Sheet

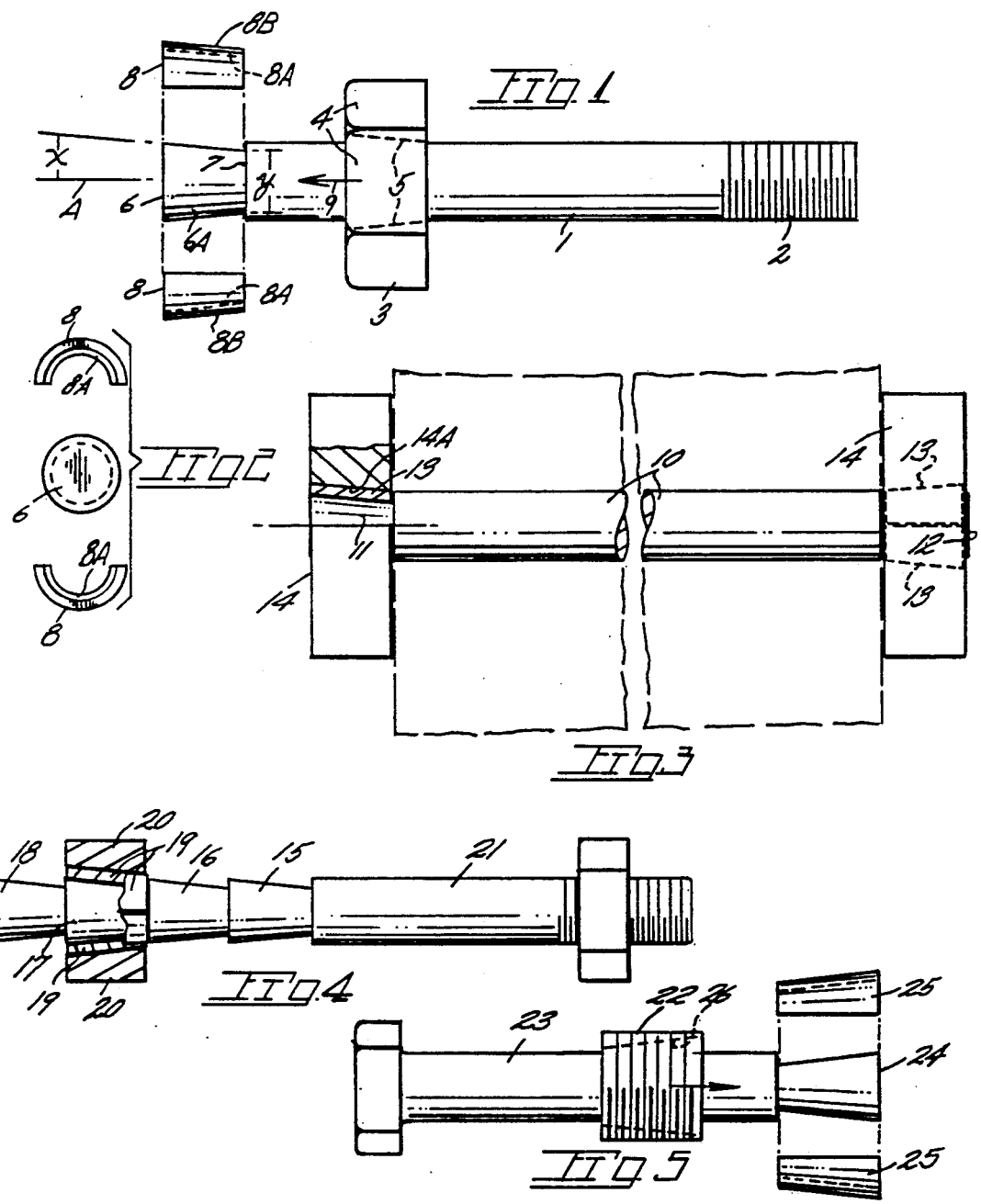

FASTENER WITH TAPER ATTACHED COMPONENT

BACKGROUND OF THE INVENTION

The present invention pertains generally to fasteners of the type having a head portion.

A sizeable inventory of threaded fasteners must be kept on hand to provide the wide array of same available to be ordered by customers. Both head configuration, shank diameter and thread specifications may vary as well as fastener length and material to provide a substantial number of variables which contribute to the quantity of fasteners that must be stocked.

Examples of fasteners with attachable heads are disclosed in U.S. Pat. Nos. 1,609,645 and 3,832,747. The former patent discloses a separate head component which permits driving of the bolt shank when in an upright position with disengagement of head and bolt shank occuring when the bolt is inverted. The second patent mentioned discloses an end fitting or head for a shank or shaft which adheres by reason of being knurled or otherwise processed to provide an irregular surface to enhance frictional engagement with the internal wall of a fastener head. Neither of the references utilize a taper for securement of a fastener part to a fastener shank nor is the concept of providing an array of fastener components disclosed permitting fastener assembly to a specific configuration.

SUMMARY OF THE PRESENT INVENTION

The present invention is embodied within a fastener wherein one or more of the fasteners components are combined with a fastener shank to provide a fastener assembly for a specific use.

The present fastener assembly includes a shank component terminating at least at one end in a tapered end segment for the reception of a fastener part having an internal tapered surface for securement purposes. Segmented conical inserts serve to lock both the shank end segment as well as an internal helical wall surface of the component being attached.

The taper utilized in a fastener embodying the present invention is not unlike tapers used in the securing of machine tools to a tool holder as for example a Morse or an ASA machine taper utilized for similar tool securement. Axially directed loads on the fastener shank result in a locking of the head component to the shank so as to provide a fastener which may be torqued and serves in the typical manner. A threaded sleeve component may be secured to a fastener shaft utilizing a tapered end segment which receives conical inserts for attachment purposes.

Additional fastener assemblies may be utilized to practice the present concept, one such assembly having oppositely disposed conical end segments each of which receives a type of head member which may serve simply as an abutment for a shaft carried article as opposed to a tool receiving head. A still further embodiment of the present invention utilizes a series of conical segments integral with a fastener shank or shaft to provide optional attachments of a head or abutment at a selected point along the shaft.

BRIEF DESCRIPTION OF THE DRAWINGS

In the accompanying drawings:

FIG. 1 is a side elevational view of a fastener with insert parts exploded to show the present invention;

FIG. 2 is an end elevational view taken from the left end of FIG. 1;

FIG. 3 is a side elevational view of a modified fastener assembly segmented for purposes of illustration;

FIG. 4 is still a further modified form of the present invention showing a fastener shank with a series of successive conical segments thereon; and FIG. 5 is a further modified version of the present invention utilizing a threaded sleeve secured in place on a fastener shank by means of a taper.

DETAILED DESCRIPTION OF THE PREFERRED EMBODIMENTS

With continuing attention to the drawings where applied reference numerals indicate parts similarly hereinafter identified the reference numeral 1 indicates the shank of a fastener which may be threaded as at 2 either partially or substantially its entire length.

A fastener head at 3 may be provided with tool receiving surfaces at 4 and may have an external appearance of a four or six sided bolt head. Head 3 is provided with a central, tapered opening defined by a frusto-conical inner wall 5.

With attention again to fastener shank 1, the same terminates at one end in a frusto-conical end segment at 6 which merges with the shaft proper at a shoulder 7. A segment inner diameter at Y is less than the diameter of shaft 1.

Inserts at 8 comprise a frusto-conical member with each insert having an inner wall surface 8A which is tapered so as to correspond with the taper of end segment surface 6A. An external wall surface 8B of each insert corresponds to the inner conical surface 5 of head 3. Accordingly, upon advancement of head component 3 in the direction of arrow 9, the head surface 5 will seat in a locking fit about insert surfaces 8B.

A range of tapers exists from which a taper may be selected for achieving locked engagement of end segment 6, inserts 8 and head 3. Such a range includes tapers at X of up to eleven degrees or so between the axis at A of shank 1 and the conical surface of end segment 6. A minimum segment diameter is at Y which is less than the shank diameter. Maximum segment diameter may be less than shank diameter but normally will not exceed said diameter.

In FIG. 3, a modified form of the present fastener is shown wherein a shank 10 terminates at its ends in tapered end segments 11 and 12. Pairs of conical inserts at 13, of the type above described, have internal surfaces which correspond to the external surfaces of end segments 11 and 12 while retainers at 14 each have an internal conical wall 14A. The corresponding tapers of the end segments, inserts and retainers effect a locking of the retainers to shank 10.

In FIG. 4, a series of tapered shank segments at 15, 16, 17 and 18 permit selective attachment of a fastener head 20 along a stepped tapered shank 21. Inserts as above described are indicated at 19.

In FIG. 5, provision is made for securing a sleeve component 22, at least partially threaded, to a fastener shank 23 having a conical end segment 24. Pairs of inserts at 25 are as above described to provide locking engagement with an internal conical wall 26 of sleeve 22. Sleeve 22 when secured to end segment 24 serves in the capacity of a threaded segment integral with shank 23.

In use, the present invention is particularly suited for large fasteners used in heavy construction. The fastener components are selected and assembled according to the requirements at hand. Seated engagement of the components is effected by an axially directed impact blow.

The present design will allow semi-permanent attachment of a head and/or thread component or both to a shaft without increasing the diameter of the shaft. The stresses and expenses of hot and cold heading are eliminated.

While I have shown but a few embodiments of the invention, it will be apparent to those skilled in the art that the invention may be embodied still otherwise without departing from the spirit and scope of the invention.

Having thus described the invention, what is desired to be secured by a Letters Patent is:

1. In combination,
    a fastener shaft having a segment with a frusto-conical wall with a selected taper of eleven degrees or less,
    inserts in place about said segment and each having curved inner and outer surfaces, said surfaces formed on said selected taper to provide each of said inserts with a uniform wall thickness,
    a fastener component with flats thereon for securement to said shaft and having an internal frusto-conical surface formed on said selected taper for surfacial locking engagement with the outer surfaces of said inserts.

2. The combination claimed in claim 1 wherein said selected taper is the included angle between the axis of said shaft and the frusto-conical wall.

3. The combination claimed in claim 1 wherein said frusto-conical segment has a maximum diameter and a minimum diameter, said minimum diameter being less than the diameter of said shaft.

4. The combination claimed in claim 1 wherein said fastener component flats are for engagement with a tool for applying torque to the fastener shaft.

5. The combination claimed in claim 1 wherein said shaft is threaded for a portion of its length to receive a nut element.

6. The combination claimed in claim 1 wherein said shaft has a series of conical segments permitting selective attachment of the fastener component.

7. The combination claimed in claim 1 wherein said fastener component is a threaded sleeve.

* * * * *